(12) United States Patent
Serban

(10) Patent No.: US 8,781,932 B2
(45) Date of Patent: Jul. 15, 2014

(54) PLATFORM FOR HOSTING VIRTUAL EVENTS

(75) Inventor: Cristina Serban, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/569,545

(22) Filed: Aug. 8, 2012

(65) Prior Publication Data

US 2014/0046829 A1 Feb. 13, 2014

(51) Int. Cl.
*G06Q 40/00* (2012.01)

(52) U.S. Cl.
USPC .............................. 705/35; 705/40; 705/300

(58) Field of Classification Search
USPC ........................................... 705/35, 40, 300
See application file for complete search history.

(56) References Cited

U.S. PATENT DOCUMENTS

| | | | |
|---|---|---|---|
| 7,823,068 B2 | 10/2010 | Cowtan et al. | |
| 2001/0034661 A1 | 10/2001 | Ferreira | |
| 2007/0225911 A1* | 9/2007 | Chanick | 701/213 |
| 2007/0255785 A1 | 11/2007 | Hayashi et al. | |
| 2008/0222295 A1 | 9/2008 | Robinson et al. | |
| 2008/0222538 A1 | 9/2008 | Cardu | |
| 2009/0055201 A1 | 2/2009 | Washington et al. | |
| 2009/0319306 A1* | 12/2009 | Chanick | 705/5 |
| 2010/0030578 A1* | 2/2010 | Siddique et al. | 705/3 |
| 2012/0023105 A1* | 1/2012 | Heydenfeldt | 707/741 |
| 2013/0066750 A1* | 3/2013 | Siddique et al. | 705/27.2 |

FOREIGN PATENT DOCUMENTS

| | | | |
|---|---|---|---|
| WO | WO2009118735 A2 | 10/2009 | |
| WO | WO2010009869 A2 | 1/2010 | |

* cited by examiner

*Primary Examiner* — Lalita M Hamilton
(74) *Attorney, Agent, or Firm* — Cantor Colburn LLP

(57) ABSTRACT

A platform for hosting virtual events includes a user interface module generating a user interface for accessing a virtual event; a conferencing module providing conferencing between participants of the virtual event; a virtual environment module generating a virtual environment for interaction between participants of the virtual event; and a payment processing module collecting payments from participants of the virtual event and distributing payments to an event planner.

9 Claims, 6 Drawing Sheets

PLATFORM FOR HOSTING VIRTUAL EVENTS

BACKGROUND

The present disclosure relates generally to virtual events, and more particularly, to a platform for hosting virtual events.

Virtual events are popular forms of interaction and provide an alternative to real-world interactions. For example, many people would love to travel a lot more than they actually do, but they cannot find the money, time and/or energy. Physical abilities may also be lacking for taking part in travel, especially to far away locations. Busy individuals who cannot get away long enough to reach destinations that require days just to get there may find that a half day virtual visit would be worth the expense. In all cases, watching a pre-made video of the place of interest is a low-appeal, rather unsatisfactory experience.

BRIEF SUMMARY

Exemplary embodiments include a platform for hosting virtual events including a user interface module generating a user interface for accessing a virtual event; a conferencing module providing conferencing between participants of the virtual event; a virtual environment module generating a virtual environment for interaction between participants of the virtual event; and a payment processing module collecting payments from participants of the virtual event and distributing payments to an event planner.

Other exemplary embodiments include a method for hosting virtual events including interfacing with a user system and an event planner system; generating a user interface for accessing a virtual event; providing conferencing between participants of the virtual event; generating a virtual environment for interaction between participants of the virtual event; and collecting payments from participants of the virtual event and distributing payments to an event planner.

Other exemplary embodiments include a computer program product tangibly embodied on a non-transitory computer readable storage medium, the computer program product including instructions for causing a processor to execute a method for hosting virtual events, including interfacing with a user system and an event planner system; generating a user interface for accessing a virtual event; providing conferencing between participants of the virtual event; generating a virtual environment for interaction between participants of the virtual event; and collecting payments from participants of the virtual event and distributing payments to an event planner.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
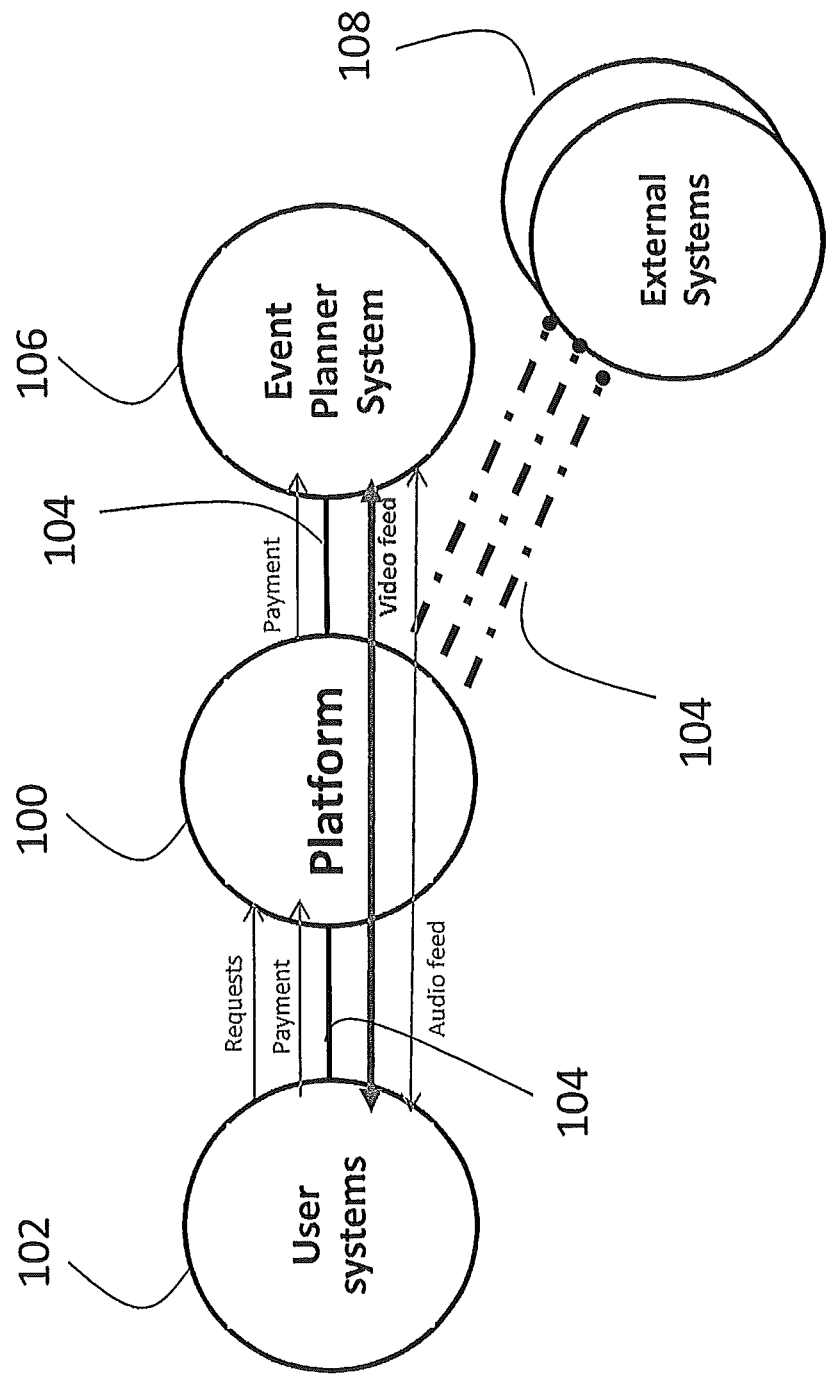
FIG. 1 depicts a system for hosting virtual events in an exemplary embodiment.

FIG. 1 depicts a system for hosting virtual events in an exemplary embodiment. The system includes a platform 100 that provides functionality for hosting virtual events. The platform 100 is described in further detail herein with reference to FIG. 3. User systems 102 are coupled to the platform 100 over a network 104. User systems 102 may be implemented using general-purpose, microprocessor based devices executing computer program instructions stored in a storage medium to perform the operations described herein. User systems 102 may include servers, personal-computers, tablets, mobile phones, etc., equipped with components (e.g., display, keyboard, microphone, camera) to interact with platform 100 as described herein.

Network 104 may be any type of known network including, but not limited to, a wide area network (WAN), a local area network (LAN), a global network (e.g. Internet), a virtual private network (VPN), an intranet, or a combination thereof. The network(s) 104 may be implemented using wireless network technologies or any kind of physical network implementation known in the art.

An event planner system 106 is coupled to the platform 100 over a network 104. Event planner system 106 may be implemented using a general-purpose microprocessor based device executing computer program instructions stored in a storage medium to perform the operations described herein. Event planner system 106 may include servers, personal-computers, tablets, mobile phones, etc., equipped with components (e.g., display, keyboard, microphone, camera) to interact with platform 100 as described herein.

External systems 108 are coupled to the platform 100 via network 104. External systems 108 may be implemented using a general-purpose microprocessor based device executing computer program instructions stored in a storage medium to perform the operations described herein. External systems 108 may provide third party services that compliment services offered by platform 100. For example, external system 108 may include a social networking site (e.g., Facebook) that allows user systems 102 to update their social media accounts with data generated through the platform 100. External system 108 may also include coupon sites (e.g., Groupon) to provide coupons related to good/services provided by platform 100.

In one exemplary embodiment, the system of FIG. 1 is used to host a virtual family reunion. A family reunion, especially for a large and geographically dispersed family, can be challenging to plan, and can end up with a number of participants still at several other locations than the desired one. A professional event planner can help by arranging the reunion as a virtual one, to include several types of activities. A professional planner utilizes event planner system 106 to coordinate a virtual family reunion, via the platform 100.

Figure 2:
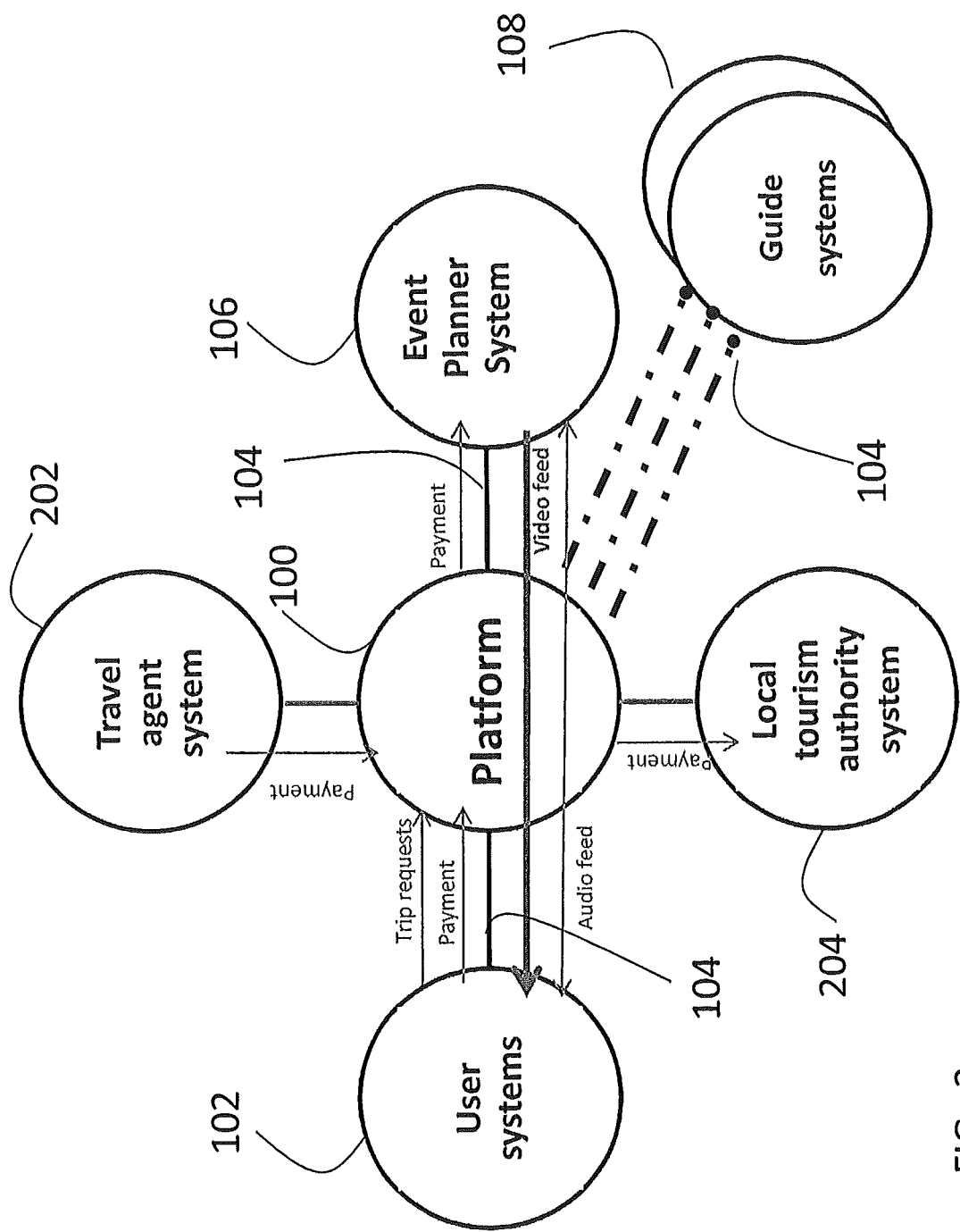
FIG. 2 depicts a system for hosting virtual events in an exemplary embodiment.

FIG. 2 depicts a system for hosting a virtual family reunion in an exemplary embodiment. The system of FIG. 2 is similar to that of FIG. 1, but FIG. 2 includes additional entities, in the form travel agent system 202 and local tourism authority system 204. Also, external systems 108 include guide systems. The virtual family reunion provides two primary activities. A meet and greet activity allows participants from any locale to meet in a virtual meeting room and greet each other, all at the same, pre-arranged time, or at various times during a given interval. Participants see each other and talk with each other in real-time. They can also share existing pictures or videos of people not present at the reunion. They can take pictures of themselves "together" in real-time, at the time of the reunion, even if they are in different locations. The meet and greet functionality may be provided by the system of FIG. 1.

The virtual family reunion also provides a virtual tour or sightseeing activity. All interested participants take a virtual trip together to a location of common interest, pre-arranged by the event planner through event planner system 106. Some of the participants may be real travelers at the location of travel, while others travel virtually. A local guide, as pre-arranged by the event planner, leads the travel by showing video images of the location and explaining what is shown, and interacts with all travel participants in real-time. Travel participants also interact with each other, as desired.

Figure 3:
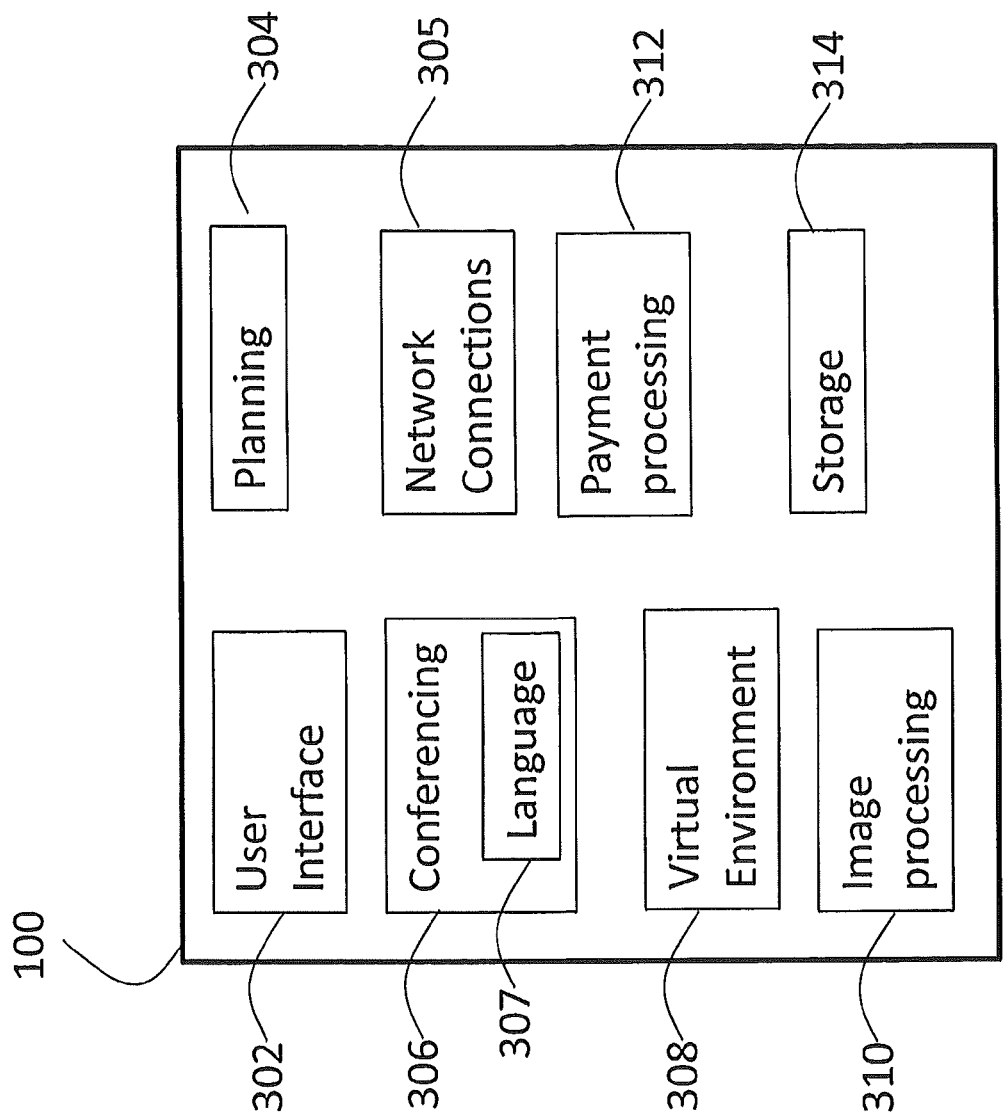
FIG. 3 depicts a platform for hosting virtual events in an exemplary embodiment.

FIG. 3 depicts a platform 100 for hosting virtual events in an exemplary embodiment. Platform 100 may be implemented using one or more computers or servers executing computer program instructions stored in a storage medium to perform the operations described herein. The platform 100 includes a number of modules to provide the processes described herein. It is understood that the modules may be implemented using a computer program or application to implement the processes described herein. Modules may also be implemented using hardware, or a combination of hardware-software. Basic components, such as processors, bus connections, etc., are not depicted for ease of illustration.

Figure 4:
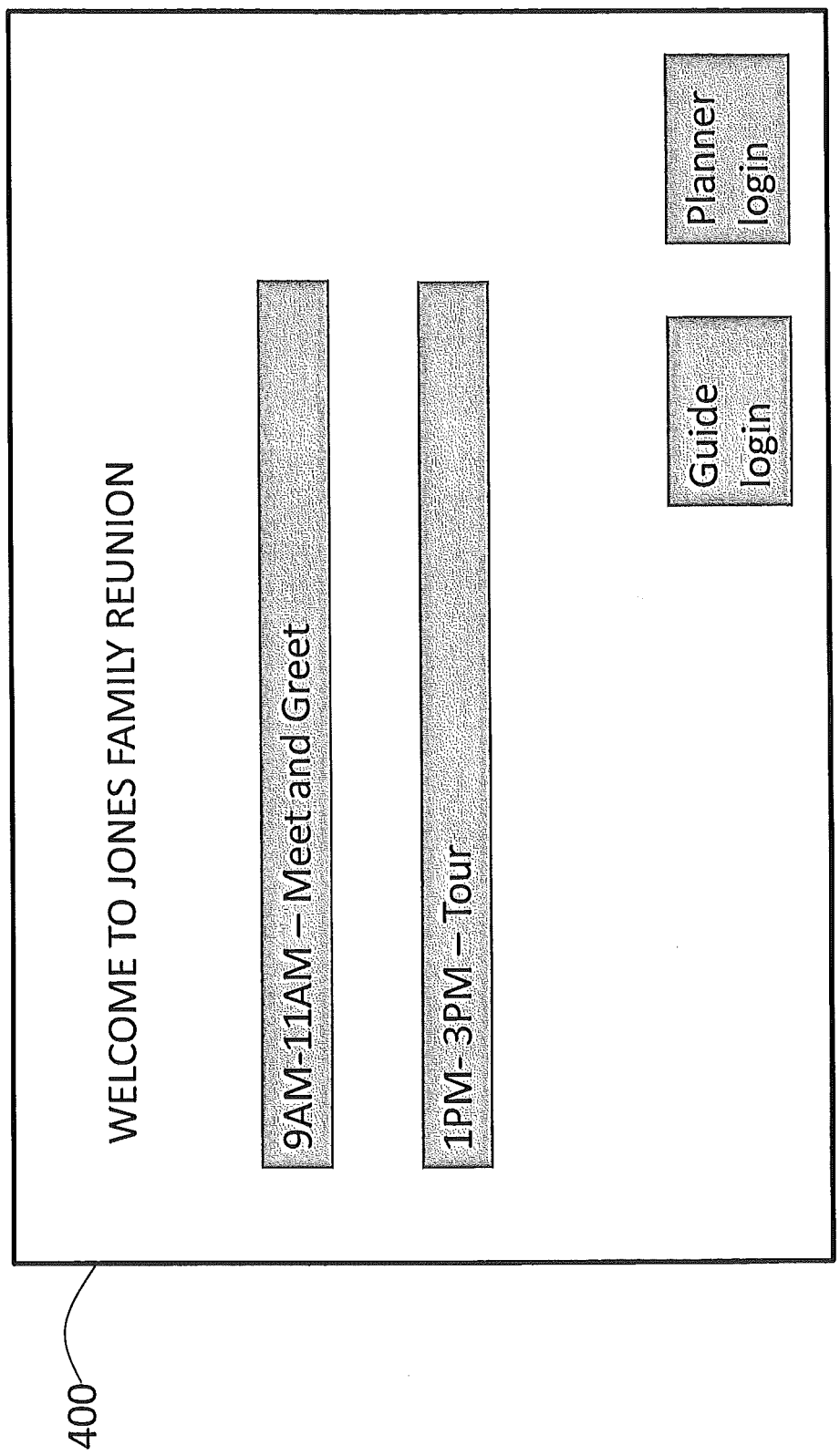
FIG. 4 depicts a user interface in an exemplary embodiment.

Platform 100 includes a user interface module 302 that provides an interface for user systems 102, event planner system 106 and guide systems 108. FIG. 4 depicts an exemplary user interface 400 presented by platform 100. User interface 400 allows a user to select a meet and greet activity and/or a virtual tour activity. User interface 400 also provides for event planner login from event planner system 106 and guide login from guide system 108. Entities accessing the platform 100 may need to be authenticated before allowing access to services such as meet and greet or a virtual trip.

Platform 100 also includes a planning module 304 that allows the event planner to perform a variety of planning tasks through event planner system 106. Planning module 304 supports an event planner with scheduling the reunion, tracking participants, their locations, schedules and preferences, event sign-up and payments, etc. Participants can view scheduled events, lists of participants, tours, etc., through the planning module 304. Planning module 304 also supports event planner system 106 with post-event tasks, such as final of payments to providers, collection of feedback, additional sales as requested (such as professional recordings of the reunion or parts thereof, "group" pictures, etc.).

Platform 100 also includes a network connections module 305. Network connections module 305 handles the interactions with users systems 102, event planner system 106, guide systems 108, travel agent system 202 and local tourism authority system 204. Network connection module 305 may use a variety of communication protocols and support both wired and wireless communications.

Platform 100 also includes a conferencing module 306 that enables audio and/or video conferencing for the user systems 102, event planner system 106 and guide systems 108. Conferencing module 306 may also support text conferencing, such as SMS. The conferencing module 306 may support high definition and/or three-dimensional video conferencing. Conferencing module 306 allows participants to interact through audio/video. Event planner system 106 can also interact with participants through conferencing module 306 to lead group activities. Conferencing module 306 also provides for interaction between participants and a guide system 108, if a virtual trip is part of the event. Conferencing module 306 includes a language processing module 307 which allows a participant to select a preferred language for audio/video conferencing. Language processing module 307 may also provide real time language translation (voice-voice, voice-text, text-voice, text-text) to facilitate interaction between participants.

Platform 100 also includes a virtual environment module 308 that handles generation of a virtual environment for the participants. This involves creating a virtual environment (e.g., a virtual meeting room) and handling interactions between participants. For example, participants may select an avatar for the virtual environment. Virtual environment module 308 allows participants to navigate the virtual environment and interact with other participants' avatars. For example, if the virtual environment module 308 can launch an audio/video conference between two or more participants based on interactions in the virtual environment.

Platform 100 also includes an image processing module 310 that provides for photo creation and editing. Image processing module 310 allows participants to upload pictures of themselves, which are then combined into a group picture. Image processing module 310 employs photo stitching and editing features to allow users to select a plurality of individual photos and have them combined into a group photo. The group photo can then be purchased, downloaded, exported from platform 100 to a social media site, etc.

Platform 100 also includes a payment processing module 312 that serves as a clearing house for payments and other exchanges. In the embodiment of FIG. 1, payments may be made from participants at user systems 102 to an event planner at event planner system 106. Payment processing module 312 collects a source for participant payments (account number/routing number, payment service, etc.) and a destination for the payments (account number/routing number, payment service, etc.). Payment processing module 312 confirms payments made, received and provides an accounting for all payments. In the embodiment of FIG. 2, additional payments may be routed to or from trip guides, the local tourism authority, travel agents, etc.

Platform 100 also includes a storage module 314 that provides multimedia storage and retrieval. Photos and/or videos from the family reunion may be stored and be available for subsequent viewing, downloading, etc. Virtual tours may be stored and made available to participants involved in the family reunion. Storage module 314 may be internal to platform 100, or an external storage device accessed over a network.

Figure 5:
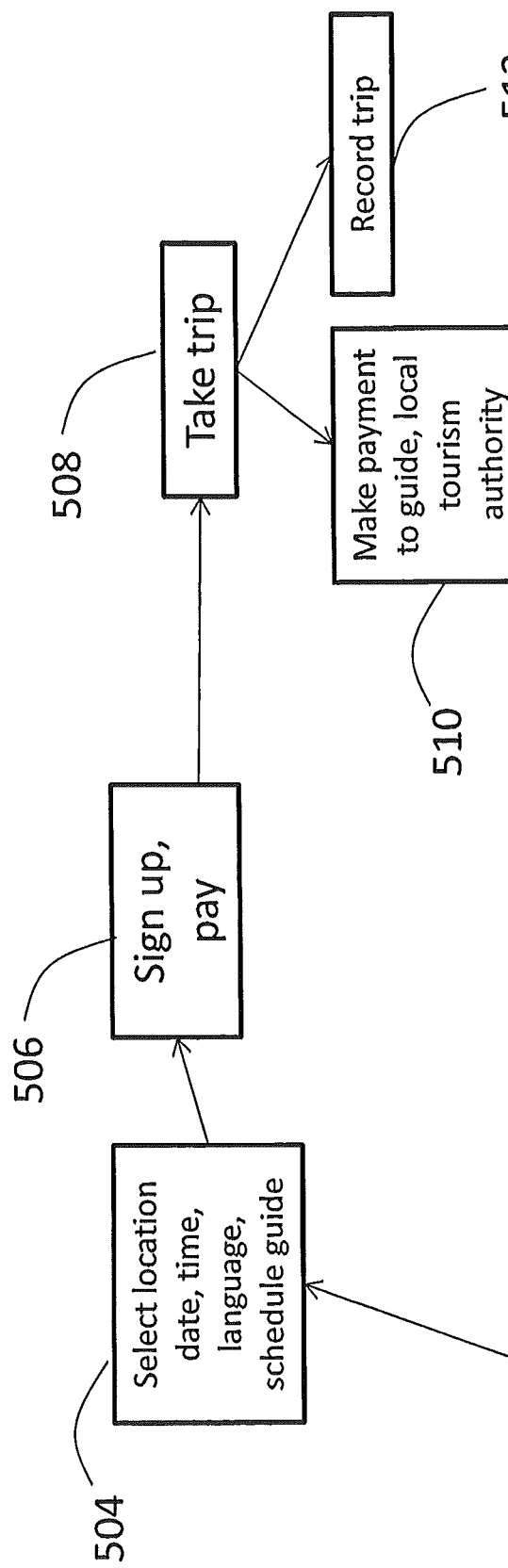
FIG. 5 depicts a process for arranging a virtual tour in an exemplary embodiment.

As noted above, the platform 100 may also enable a virtual trip as part of the family reunion experience. FIG. 5 is a flowchart of a process for taking a virtual trip. At 502 the travel is arranged. This may involve the event planner using event planner system 106 to locate a guide for a location at guide system 108. Travel agent system 202 may be consulted to find a guide or sponsor the trip. At 504 the trip details are uploaded to platform 100. This includes identifying the location, date, time and language for the trip, as well as scheduling the guide.

At 506 participants can sign up for the trip and pay. Participants may be real travelers (i.e., they will be physically at the location with the guide) or virtual travelers (i.e., they will interact with guide and real travelers through user systems 102 and platform 100). The participants and their travel status (real or virtual) are loaded to planning module 304. Payment is collected by payment processing module 312. Funds are not dispersed until the tour is provided.

Figure 6:
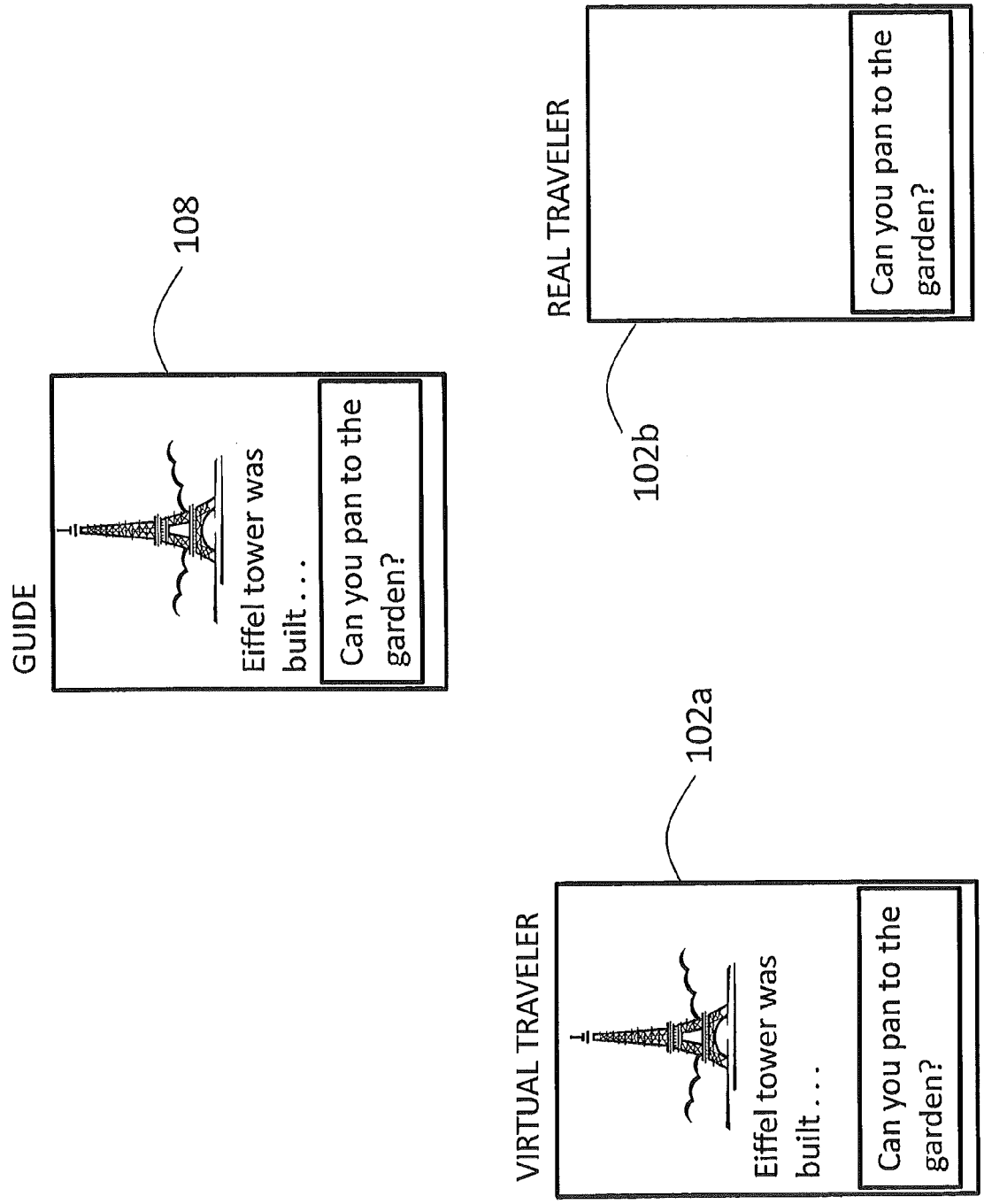
FIG. 6 depicts interaction during a virtual tour in an exemplary embodiment.

At 508, the trip is taken, led by the guide. The guide uses guide system 108 to provide audio/video to the platform 100 which is distributed to the participant systems 102. Participants with the guide (i.e., real travelers) may also carry user systems 102 to interact with virtual travelers. FIG. 6 shows an exemplary interaction between a guide, virtual traveler and real traveler. The guide uses guide system 108 to provide audio-video to participants at user systems 102 through platform 100. Any necessary translation may be performed by language module 307. A virtual traveler at user system 102a may interact with the guide system 108 and real traveler user system 102b. For example, a participant at user system 102a may request that the guide or a real traveler view another area. This allows virtual travelers to have a more involved experience in the tour, rather than simply watching the guide. The virtual travelers at user systems 102a can communicate with each other, the guide and real travelers over platform 100.

Image processing module 310 may be used to create photos of virtual travelers at the trip destination. A virtual traveler may ask that the guide obtain a still picture on the tour and upload the still picture to platform 100. A virtual traveler can then use the image processing module 310 to edit the image to include themselves at the trip destination.

Referring to FIG. 5, once the trip has been completed, payments may be made at 510 by payment processing module 312. The guide may receive a payment as well as local tourism authority. The trip is also recorded at 512 and stored in storage module 314. Video and audio from the trip is saved and participants may obtain a copy of the trip audio/video from platform 100, optionally for a fee.

Platform 100 provides a system to facilitate hosting virtual events. This allows event planners to more easily host virtual events, including virtual family reunions and virtual trips and tours. The various modules of the platform 100 support a variety of functions, automating an otherwise cumbersome task.

As described above, the exemplary embodiments can be in the form of computer-implemented processes and devices for practicing those processes, such as platform 100. The exemplary embodiments can also be in the form of computer program code containing instructions embodied in tangible media, such as, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A platform for hosting virtual events comprising:
a processor; and
memory comprising computer-executable instructions that, when executed by the processor, cause the processor to implement:
a user interface module to generate a user interface for accessing a virtual event;
a conferencing module to provide conferencing between participants of the virtual event;
a virtual environment module to generate a virtual environment for interaction between participants of the virtual event;
a payment processing module to collect payments from participants of the virtual event and to distribute payments to an event planner; and
a network connections module to interface a guide system with a user system to provide a tour of a location to a participant at the user system remote from the guide system;
the network connections module to interface a real traveler at the tour of the location with a virtual traveler at the user system remote from the location;
the network connections module to interface with a local tourism authority system;
the network connections module to interface with a travel agent system to determine a human guide for the virtual event;
the network connections module to interface with an event planner system;
wherein the payment processing module is to distribute payments to the human guide associated with the guide system and is to distribute payments to a local tourism authority associated with the location.

2. The platform of claim 1 further comprising:
an image processing module, the image processing module to group a plurality of images from a plurality of user systems into a single image.

3. The platform of claim 1 wherein:
the conferencing module includes a language module, the language module to select a language for the conferencing.

4. The platform of claim 3 wherein:
the language module to provide language translation during the conferencing.

5. A computer program product tangibly embodied on a non-transitory computer readable storage medium, the computer program product including instructions for hosting virtual events that, when executed by a processor, cause the processor to perform to operations comprising:

interfacing with a user system and an event planner system;

generating a user interface for accessing a virtual event;

providing conferencing between participants of the virtual event;

generating a virtual environment for interaction between participants of the virtual event;

collecting payments from participants of the virtual event and distributing payments to an event planner;

interfacing a guide system with a user system to provide a virtual tour of a location to a participant at the user system remote from the guide system;

interfacing a real traveler at the tour of the location with a virtual traveler at the user system;

interfacing with a local tourism authority system;

interfacing with a travel agent system to determine a human guide for the virtual event;

distributing payments to the human guide associated with the guide system; and distributing payments to a local tourism authority associated with the location.

6. The computer program product of claim 5 wherein the operations further comprise:

providing image processing to group a plurality of images from a plurality of user systems into a single image.

7. The computer program product of claim 5 wherein the operations further comprise:

providing conferencing includes selecting a language for the conferencing.

8. The computer program product of claim 7 wherein the operations further comprise:

selecting the language for the conferencing includes providing language translation during the conferencing.

9. A platform for hosting virtual events comprising:

a processor; and memory comprising computer-executable instructions that, when executed by the processor, cause the processor to implement:

a user interface module to generate a user interface for accessing a virtual event;

a conferencing module to provide conferencing between participants of the virtual event, wherein the conferencing module includes a language module, the language module to select a language for the conferencing, the language module to provide language translation during the conferencing;

a virtual environment module to generate a virtual environment for interaction between participants of the virtual event;

a payment processing module to collect payments from participants of the virtual event and to distribute payments to an event planner;

a network connections module to interface a guide system with a user system to provide a tour of a location to a participant at the user system remote from the guide system;

an image processing module, the image processing module to group a plurality of images of individuals from a plurality of user systems into a single group image;

a storage module to store multimedia content from the virtual event and to allow access to the multimedia content to attendees of the virtual event;

the network connections module to interface a real traveler at the tour of the location with a virtual traveler at the user system;

the network connections module to interface with a local tourism authority system;

the network connections module to interface with a travel agent system to determine a human guide for the virtual event;

the network connections module to interface with an event planner system;

the network connections module to interface with a social networking site and a coupon site providing coupons related to the virtual event;

wherein the payment processing module is to distribute payments to the human guide associated with the guide system and is to distribute payments to a local tourism authority associated with the location.

\* \* \* \* \*